United States Patent [19]
Holt

[11] Patent Number: 4,830,046

[45] Date of Patent: May 16, 1989

[54] EXCESS FLOW CONTROL VALVE

[75] Inventor: Earl R. Holt, Rochester, Mich.

[73] Assignee: Hose Specialties/Capri, Inc., Highland Park, Mich.

[21] Appl. No.: 257,114

[22] Filed: Oct. 11, 1988

Related U.S. Application Data

[63] Continuation of Ser. No. 184,970, Apr. 22, 1988, abandoned.

[51] Int. Cl.4 ............................................. F16K 17/30
[52] U.S. Cl. .................................... 137/460; 137/517
[58] Field of Search ............... 137/460, 517, 519, 539

[56] References Cited

U.S. PATENT DOCUMENTS

| | | | |
|---|---|---|---|
| 2,929,399 | 3/1960 | Magowan, Jr. | 137/517 X |
| 3,106,226 | 10/1963 | Machen | 137/517 X |
| 3,331,389 | 7/1967 | Kirk | 137/517 X |
| 3,489,172 | 1/1970 | Whitmore | 137/517 X |
| 3,977,430 | 8/1976 | Bushee | 137/460 |
| 4,638,835 | 1/1987 | Chuang | 137/460 X |

Primary Examiner—John Rivell
Attorney, Agent, or Firm—Harness, Dickey & Pierce

[57] ABSTRACT

A liquid flow shut-off valve has a one piece housing with an internal ball valve biased by a coil spring to a normal position axially separated from its valve seat, precompression of the coil spring being adjusted so that a predetermined drop in downstream pressure allows upstream pressure to seat the ball valve and stop flow.

10 Claims, 1 Drawing Sheet

3

EXCESS FLOW CONTROL VALVE

This is a continuation of U.S. patent application Ser. No. 07/184,970, filed Apr. 22, 1988 now abandoned.

This invention relates to excess flow control valves, that is valves which will respond to a decrease in downstream pressure to shut off flow in a liquid flow system.

Prior Art

The following United States patents have been located on a search of prior art relative to the present invention. U.S. Pat. No. 1,001,324, issued Aug. 22, 1911 to W. B. Thompson, entitled Fluid Controlling Valve Mechanism; U.S. Pat. No. 2,353,191, issued July 11, 1944 to David Samiran, entitled Automatic Shut-Off Valve; U.S. Pat. No. 2,357,321, issued Sept. 5, 1944 to Ernest W. Fuller, entitled Control; U.S. Pat. No. 2,657,706, issued Nov. 3, 1953 to Robert L. Stephenson, entitled Hydraulic Brake Fuse; U.S. Pat. No. 2,931,178, issued Apr. 5, 1960 to Louis Straus, entitled Safety Attachment for Fluid Pressure Operated Brake System; U.S. Pat. No. 3,561,471, issued Feb. 9, 1971 to Asa D. Sands, entitled Safety Valve; U.S. Pat. No. 4,010,770, issued Mar. 8, 1977 to Clifford M. Peters, entitled Velocity Flow Control Valve for Fluid Line; U.S. Pat. No. 4,269,223, issued May 26, 1981 to Raymond D. Carter and Alan L. Clark, entitled Resetable Pneumatic Overrun Control Valve; U.S. Pat. No. 4,605,039, issued Aug. 12, 1986 to Myron J. Johnson and Mark C. Kokao, entitled Run-Away Protective Fuse Valve. It is believed that the structures shown in these various references are distinct from those of the present invention which provides a simpler construction and has somewhat different features and mode of operation.

BRIEF SUMMARY OF THE INVENTION

It is the purpose of this invention to provide a relatively simple and reliable valve that may be used in liquid flow lines to shut off the flow of liquid when the flow increases above a certain preselected level.

An important application of valves according to the invention is in paint spray systems. In such systems the work station for an operator may have several paint spray guns. Ordinarily the liquid paint is separately supplied to each paint spray gun at a relatively high pressure, about 250 p.s.i. It is ordinarily necessary that the paint spray gun be attached to a flexible hose and occasionally these hoses rupture. When this happens, a considerable amount of liquid paint can be spilled before the operator or someone else can close the shut-off valve to cut off further supply of paint. It is a particular object of the present invention to provide an excess flow control valve that may be used in the supply line to each spray gun that will respond to an increase in flow (such as would be occasioned by the rupture of the hose) by stopping all flow in the line to the spray gun. Since each work station may need several valves, it is desirable that the valve be relatively inexpensive as well as reliable; and it is also desirable that it be compact and light in weight.

The invention accomplishes the foregoing by means of a relatively simple valve construction that may be rather inexpensively manufactured. In preferred form it comprises a hexagonal piece of bar stock which provides a one piece elongated valve body. An aperture is provided in the body to extend coaxially along the longitudinal axis of the body. One end of the aperture is provided with a first internally threaded section whereby it may be connected to a liquid supply line. The other end of the body is shaped to provide an externally threaded nipple which may be coupled to a downstream conduit for delivering the liquid, such as a flexible hose going to a paint spray gun. The aperture within the valve body has a second section which is threaded to receive a spider type valve seat member. A ball valve is spring pressed continuously in a direction to urge it to seat on the spider valve seat member. The spider valve seat member is apertured so tha, even though the ball is seated on it, liquid can flow past the ball in a relatively unrestricted manner. In normal operation of the valve, it can flow downstream past the ball seat valve member to the ultimate destination of the liquid, such as the paint spray gun. The other end of the second section of the aperture is provided with a valve seat against which the ball valve can seat itself and shut off flow through the aperture and therefore through the valve. It will do this when the pressure differential on the valve changes to the degree that the pressure on the downstream side of the ball valve is insufficient to hold it seated on the spider. This may occur if there is a rupture in the liquid supply hose downstream of the valve, for example. Should such a rupture occur, there would be a sharp drop in downstream pressure creating a tendency for an excess amount of liquid to flow through the valve. At the point, the ball valve will be sealed by the increase in pressure differential against the seat and held there so long as there is a low pressure on the downstream side of the valve. The compression of the spring that it is utilized to hold the ball valve against the spider-type valve seat may be adjusted by either actually moving the spider valve seat through its threaded connection with the body or by moving a threaded spring back-up member that has a threaded connection with a threaded portion of a third aperture section. A further feature comprises a blow-off opening on the upstream side of the ball valve which may be manually opened to allow pressure that has built-up on the upstream side to be released. The various internal parts are such that they can be readily removed in order to enable the valve to be cleaned out from time to time should that be necessary.

Other features, objects, and advantages of the invention will appear hereinafter.

DETAILED DESCRIPTION OF THE PREFERRED EMBODIMENT

Figure 1:
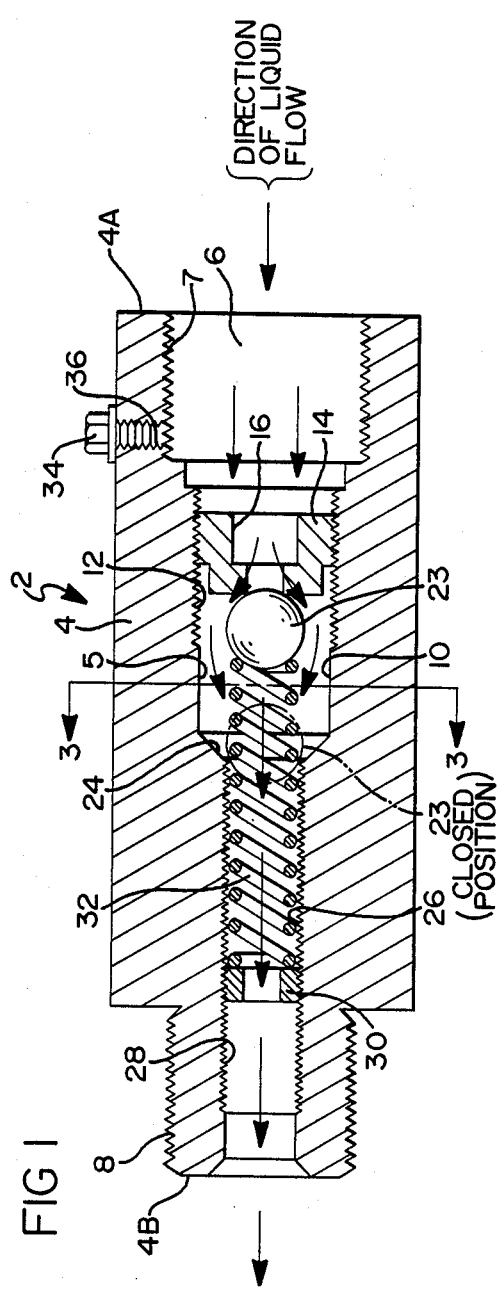
FIG. 1 is a longitudinal section taken through a valve incorporating the present invention.
Figure 3:
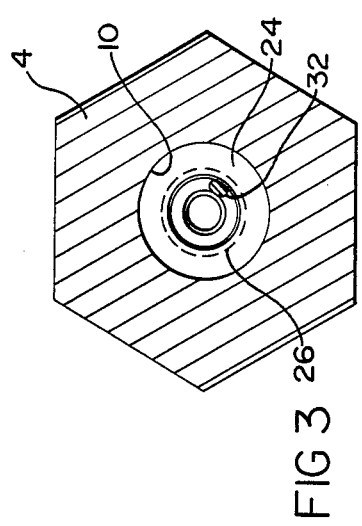
FIG. 3 is a cross-section taken along the line 3—3 of FIG. 1.

The excess flow control valve 2 of this invention comprises a piece of hexagonal metal bar stock forming the valve body 4. The valve body has an upstream or inlet end, 4A, and a downstream or outlet end, 4B. Extending through the body 4 from the inlet, or upstream end, to the downstream, or outlet end, is an aperture, 5, that is coaxial with the longitudinal axis of the valve body, 4.

The aperture 5 has a first section 6 at the inlet, or upstream, end and this is internally pipe-threaded, as seen at 7, whereby a supply pipe (not shown) may be threaded into the section 6 to deliver liquid to the valve 2.

The downstream end of the valve body 4 is reduced in diameter and width to form a cylindrical nipple section 8. This has external threads 9 whereby the outlet end of the valve 2 may be coupled to a conduit (not shown) such as the flexible supply hose for a spray gun. It is preferred that the body 4 be of one piece construction, as just described, since that simples manufacture and reduces potential for leakage to a minimum.

Figure 2:
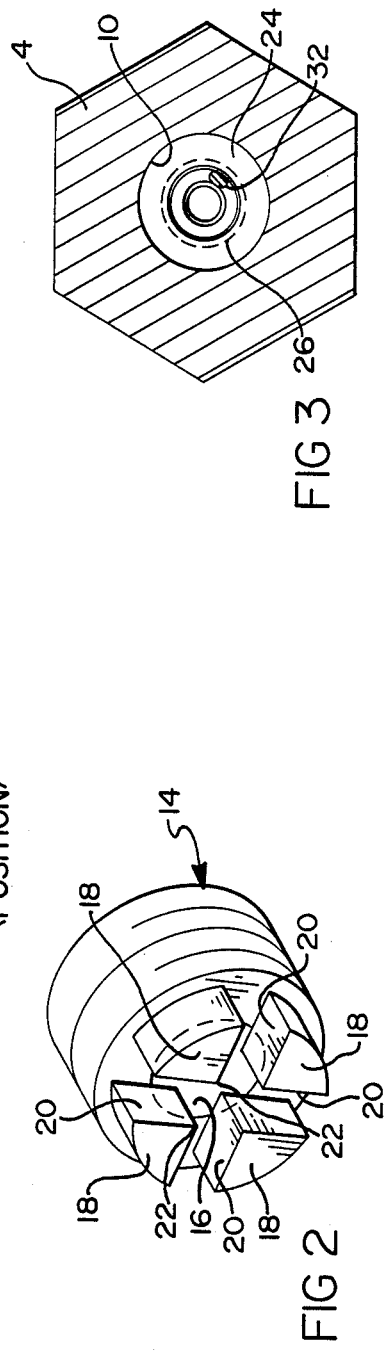
FIG. 2 is a somewhat diagramatic perspective view of the spider-type valve seat member utilized in the valve of FIG. 1.

The internal aperture 5 for the valve body 4 has a second section 10 which is of smaller diameter that the first section 6. It is internally threaded at its upstream end as indicated at 12. A valve holder or positioner in the form of an externally threaded spider-type valve seat member 14 threads into the threaded portion 12 of the aperture. The spider valve seat 14 has an aperture 16 extending through it for the flow of liquid. While this is shown in FIG. 2 as circular, it may be, and preferably is, hexagonal so that it may receive the end of an Allen wrench (not shown) to facilitate installation, adjustment and removal of the spider member in or from the threaded portion 12. The downstream end of the threaded spider valve seat 14 has four pie shaped lands 18 as defined by four radial slots 20 and these produce four inner points or corners 22 on which the ball valve 23 can seat during normal operation of the valve 2. The size of the hole 16 and the size of the radial slots 20 are such as to provide a flow area that permits substantially unrestricted liquid flow with little or no pressure loss through the spider seat member 14 past the valve 23 and to the outlet end 4B of the valve body.

The downstream end of the second section 10 of aperture 5 is frusto-conical or tapered to provide a valve seat 24. At its smaller diameter the seat 24 forms the inlet end of a third section 26 in aperture 5 which is smaller in diameter that the section 10. The smaller diameter section 26 has a threaded portion 28 which preferably begins at valve seat 24 and covers a major part of the length of aperture section 26. This threadably receives an internally apertured spring back-up member in the form of externally threaded adjustment nut 30. The nut 30 may be inserted and removed from the inlet end of the body 4 through the first and second sections 6 and 10. The hole through the nut is preferably hexagonal to receive an Allen wrench (not shown) whereby it may be readily installed, adjusted, and removed. The nut 30 serves as an adjustable back-up or shoulder for the downstream end of coil spring 32. This has an upstream end that presses against the ball valve 23 to normally bias and urge the ball into a seated relationship on the corners 22 of the spider valve seat 14. It is apparent that by adjusting the longitudinal threaded position of the nut 30 (or spider 14) the compression of the coil spring 32 may be adjusted and that this will serve as a means for preselecting and predetermining the conditions under which the valve 23 will come away from the spider 14 and be seated against the tapered seat 24. When seated against the seat 24 the ball will seal off the aperture 5 and be retained in that seated and sealed position by hydrostatic pressure of liquid on the inlet or upstream end of the valve.

As seen in FIG. 1, a threaded member 34 extends into a threaded transverse aperture or weep hole 36 that opens into the first section 6 of the aperture 5. When the threaded member 34 is removed or backed off, pressure in the section 6 will be relieved. This will permit the ball valve to be released from the seat 24 whereby the spring 32 can again force it to seat on the corners 22 of the spider ball retainer 14. The valve 2 will then be ready for normal operation where it allows full flow of liquid to a work station.

In start-up of a liquid flow system containing valve 2 there will initially be little or no downstream pressure. Therefore, the usual manual valve (not shown) upstream of valve 2 can be operated to gradually increase flow through valve 2 at a slow enough rate to avoid seating of the ball valve 23. Once the desired downstream pressure is reached it will act in conjunction with the spring 32 to hold the ball on spider 14. As indicated above, the longitudinal positions of nut 30 and spider 14 can be adjusted to preset or predetermine the drop in downstream pressure or increase in flow that will result in a condition wherein pressure on the upstream side of the valve member 23 forces it instantly against seat 24 to shut-off flow through the valve.

If used with certain liquids, such as paints, it may be desirable from time to time to clean out the valve 2. It will be recognized that this is facilitated by the easy removal of spider 14 through enlarged section 6 (allowing removal of ball 23 and spring 23) as well as by removal of nut 30, if desired, and/or threaded plug 34. The one piece valve body removes the possibility of leakage due to faulty reassembly after cleaning.

If it is to be noted that the various parts of internal aperture 5 can be readily machined by drill and tap means, etc., from the right end of the body 4. Also, the various internal parts can be inserted and removed froom the right end.

Modifications may be made in the specific structure shown without departing from the spirit and scope of the invention.

I claim;

1. A valve that closes to shut-off flow in response to a predetermined drop in downstream pressure comprising an elongated valve body having a longitudinal axis, one end of the body being the upstream and inlet end and the other end of the body being the downstream and outlet end, said body having an aperture extending from the inlet end to the outlet end along said longitudinal axis, said aperture having a first section at the upstream end of said body and the upstream end of said first section being threaded for attachment to a conduit that supplies liquid to the valve, said aperture having a second section adjacent to and communicating with the first section and smaller in diameter than the first section, the upstream end portion of said second section being threaded, a valve positioner threadably mounted in the threaded upstream end portion of said second section and being removable from the valve body through the first section of the aperture, a valve member in said second section adapted to engage said positioner and be positioned by it, said positioner having openings in it providing for continuous relatively unrestricted liquid flow from said first section to said second section even when the positioner is engaged by the valve member, said aperture having a third section adjacent to and communicating with the second section and with said outlet end, said body having a radial valve seat at the interface of the second and third aperture sections, said valve member being adapted to seat on said valve seat on a liquid sealing engagement whereby said valve seat and valve member control liquid flow from the second section to the third section, said third section having a threaded portion, an apertured adjustment nut threadably mounted in said threaded portion of said third section, a coil spring based at its downstream end against said adjustment nut and at its upstream end against the valve member to act with downstream liquid pressure to resiliently urge the valve member to engage the valve positioner, said adjustment nut providing means to control compression of the coil spring and the pressure applied by it to hold the valve member off the valve seat and against the valve positioner, whereby the spring pressure on the valve member may be adjusted to produce seating of the valve member on the valve seat by upstream liquid pressure when downstream liquid pressure has dropped below a predetermined level.

2. A valve as set forth in claim 1 wherein said valve member comprises a ball.

3. A valve as set forth in claim 2 wherein said valve positioner comprises a spider type valve seat member.

4. A valve as set forth in claim 1 wherein said valve positioner comprises a spider type valve seat member.

5. A valve as set forth in claim 1 wherein the valve positioner is adjustable longitudinally of the aperture to provide means to adjust the spacing of the positioner from the valve seat.

6. A valve as set forth in claim 2 wherein the valve body is hexagonal in cross section.

7. A valve as set forth in claim 1 including means for selectively relieving hydrostatic pressure in the first section of the aperture.

8. A valve as set forth in claim 1 wherein the valve body is of one piece construction.

9. A valve as set forth in claim 1 wherein the first section is internally threaded and the valve positioner, spring, and valve member can be removed from the body through said first section.

10. A valve as set forth in claim 1 wherein the valve body is of one piece construction wherein the first section is internally threaded for attachment to a conduit delivering liquid to the valve, said body having an externally threaded nipple formed in it at its outlet end and containing a portion of said aperture third section and being adapted by said external threads for attachment to a coupling connecting the valve to a conduit for delivering liquid to a work station.

* * * * *